United States Patent
Heinold et al.

(10) Patent No.: US 11,107,596 B2
(45) Date of Patent: Aug. 31, 2021

(54) FLANGE FLUSH TOOL

(71) Applicant: GE-Hitachi Nuclear Energy Americas LLC, Wilmington, NC (US)

(72) Inventors: Mark Heinold, San Jose, CA (US); Kenneth Mark Cole, Wilmington, NC (US); Gary Runkle, Wilmington, NC (US); Adam Holifield, Wilmington, NC (US); Mark Allison, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 364 days.

(21) Appl. No.: 15/813,260

(22) Filed: Nov. 15, 2017

(65) Prior Publication Data

US 2019/0148026 A1    May 16, 2019

(51) Int. Cl.
| | |
|---|---|
| *G21C 19/19* | (2006.01) |
| *G21C 17/108* | (2006.01) |
| *G21C 19/20* | (2006.01) |
| *G21C 17/10* | (2006.01) |
| *B08B 9/045* | (2006.01) |

(52) U.S. Cl.
CPC ............. *G21C 19/19* (2013.01); *G21C 17/10* (2013.01); *G21C 17/108* (2013.01); *G21C 19/207* (2013.01); *B08B 9/045* (2013.01)

(58) Field of Classification Search
CPC ........ G21C 19/00; G21C 19/19; G21C 17/10; G21C 17/108; G21C 19/207; B08B 9/045
See application file for complete search history.

(56) References Cited

U.S. PATENT DOCUMENTS

| | | | |
|---|---|---|---|
| 4,534,932 A | 8/1985 | Yoshikawa et al. | |
| 4,687,626 A * | 8/1987 | Tong | F22B 37/42 376/283 |
| 4,790,976 A * | 12/1988 | Zahn | G21C 17/108 376/245 |
| 5,406,595 A | 4/1995 | Axling | |
| 5,600,685 A * | 2/1997 | Izzo | G21C 19/105 376/260 |
| 6,450,104 B1 * | 9/2002 | Grant | B08B 9/049 104/138.1 |

OTHER PUBLICATIONS

Extended European Search Report for corresponding Application No. 18206263.8-1212, dated Mar. 26, 2019.
Taiwanese Office Action and Search Report for corresponding Application No. 107140249, dated Oct. 14, 2019, English translation thereof.
European Office Action dated Mar. 11, 2021, issued in corresponding European Patent Application No. 18 206 263.8.

* cited by examiner

*Primary Examiner* — Lily C Garner
(74) *Attorney, Agent, or Firm* — Harness, Dickey & Pierce, P.L.C.

(57) ABSTRACT

A flange flush tool includes an outer tube having a first end and a second end, the first end configured to engage the flange, and a shield tube within the outer tube. A channel is defined between an outer surface of the shield tube and an inner surface of the outer tube. The shield tube is configured to move longitudinally within the outer tube.

12 Claims, 22 Drawing Sheets

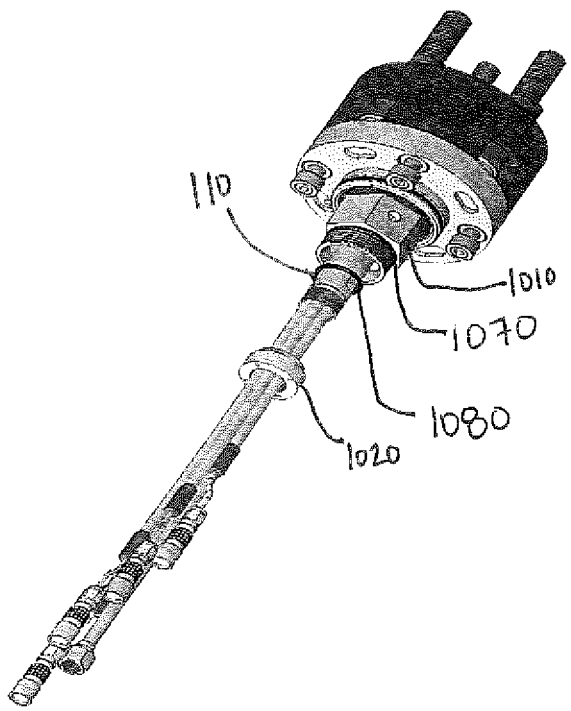
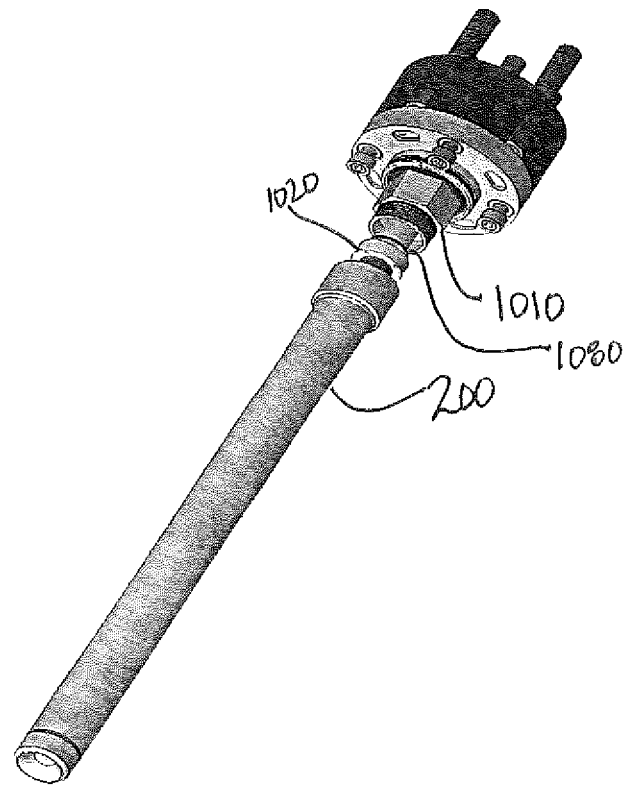
FIG. 10H
FIG. 10I

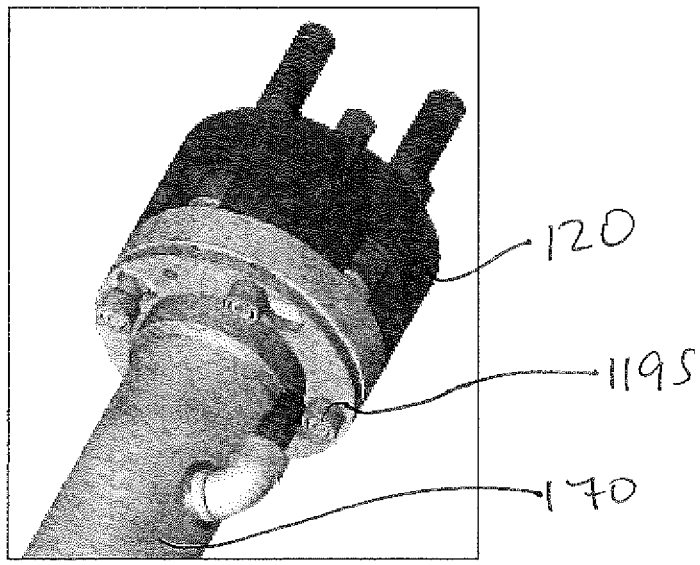
FIG. 10O
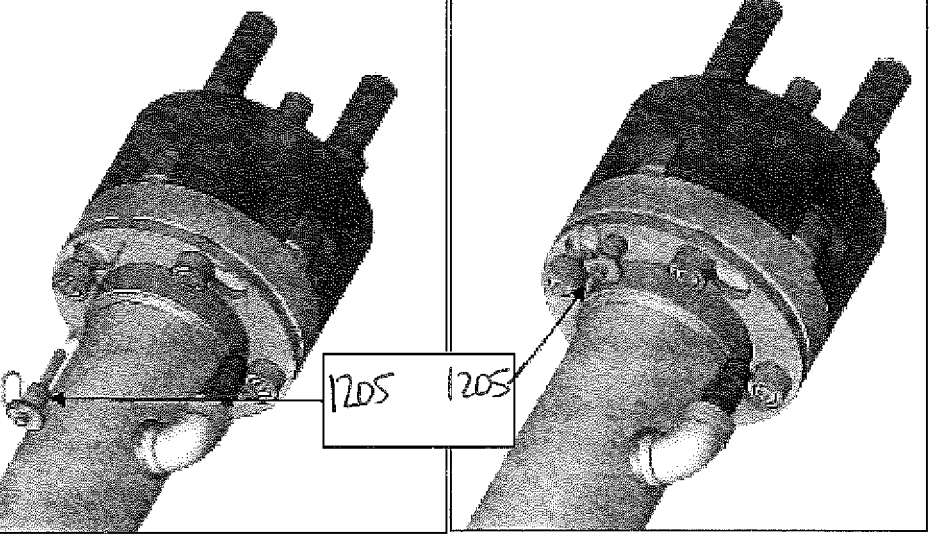
FIG. 10P
FIG. 10Q

FLANGE FLUSH TOOL

FIELD

The present disclosure relates to a flush tool configured to lift a dry tube of a nuclear reactor from a seat of a flange so as to flush the flange of any water and/or contaminants.

BACKGROUND

A boiling water nuclear reactor may include dry tube assemblies that house sensors and/or position sensors in a core of the reactor.

SUMMARY

At least one example embodiment relates to a flange flush tool.

In at least one example embodiment, a flange flush tool includes an outer tube having a first end and a second end, the first end configured to engage the flange, and a shield tube within the outer tube. A channel is defined between an outer surface of the shield tube and an inner surface of the outer tube. The shield tube is configured to move longitudinally within the outer tube.

In at least one example embodiment, the flange flush tool may also include an actuator configured to move the shield tube within the outer tube. The actuator is a coaxial pneumatic actuator.

In at least one example embodiment, the flange flush tool further includes a compressed air supply, a control panel including at least one push-button valve, and at least one air hose in fluid communication with the coaxial pneumatic actuator.

In at least one example embodiment, the shield tube has a first end surface configured to engage an end surface of the dry tube. The shield tube has a second end surface including a contact point. The contact point is configured to engage the actuator.

In at least one example embodiment, the flange flush tool further includes a vacuum breaker configured to selectively allow air into the channel. The vacuum breaker is a check valve that prevents flow in one direction and allows flow in a second direction.

In at least one example embodiment, the flange flush tool further includes a drain port in the outer tube. The drain port is configured to drain materials from the channel. The drain port includes an isolation valve, such as a ball valve.

In at least one example embodiment, the outer tube has an inner diameter ranging from about 2 inches to about 10 inches. The shield tube has an outer diameter ranging from about 1 inch to about 9 inches.

In at least one example embodiment, each of the outer tube and the shield tube are formed of stainless steel.

At least one example embodiment relates to a method of flushing a flange. The method includes engaging an end surface of a dry tube and lifting the dry tube from the flange.

In at least one example embodiment, the engaging occurs after shutting down a reactor housing the flange. The reactor is a boiling water reactor.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

Corresponding reference numerals indicate corresponding parts throughout the several views of the drawings.

DETAILED DESCRIPTION

Figure 1:
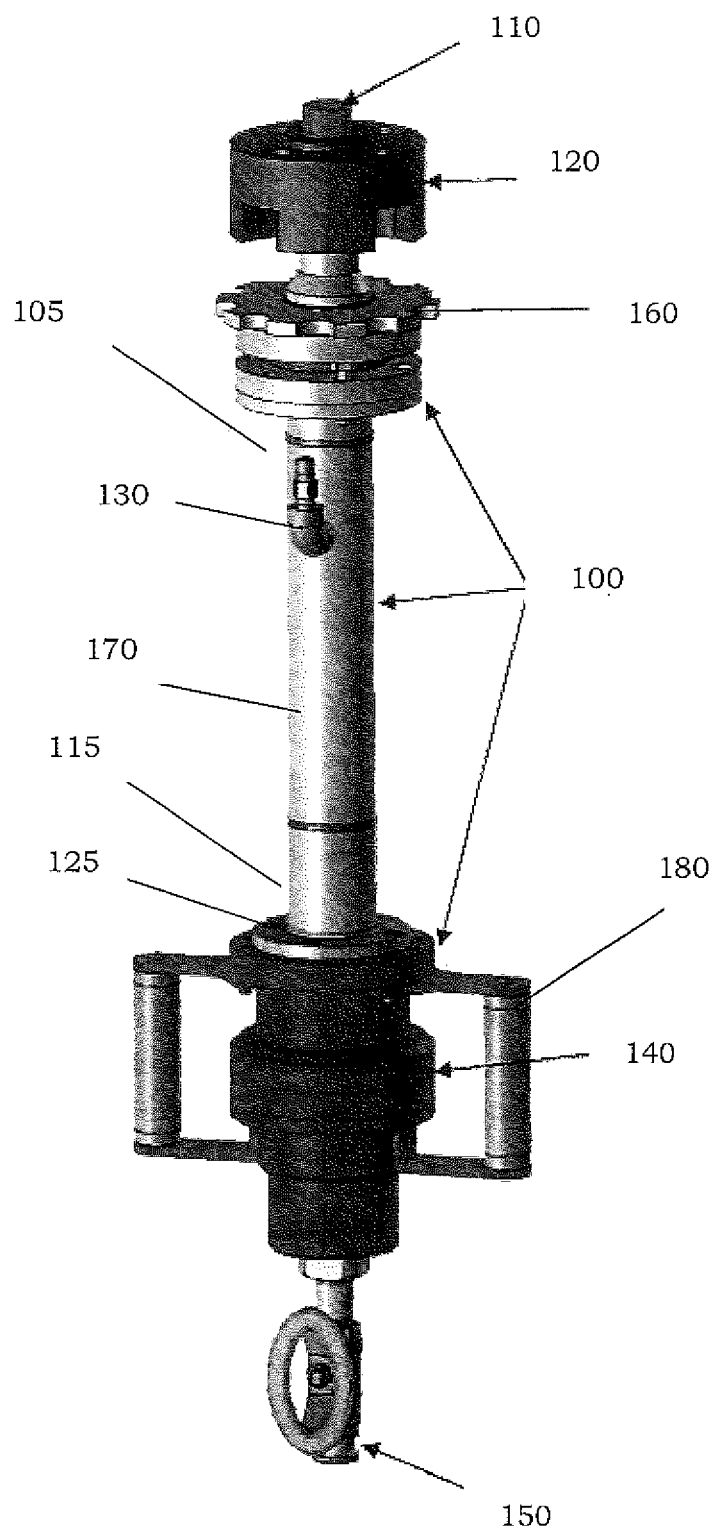
FIG. 1 is perspective view of a flange flush tool engaging a flange and dry tube of a boiling water nuclear reactor according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Boiling water reactors may include dry tube assemblies including at least one dry tube fitted with a flange. The dry tube may house sensors. The dry tube is positioned in a core region of the reactor. During maintenance, the dry tube may be unseated from the flange to drain contaminated water therefrom. A flange flush tool as described herein may be used to unseat the dry tube without support from a nuclear plant's refueling bridge.

FIG. 1 is perspective view of a flange flush tool engaging a flange and dry tube of a boiling water nuclear reactor according to at least one example embodiment.

In at least one example embodiment, a flange flush tool 100 includes an outer tube 170 having a first end 105 and a second end 115. The first end 105 is configured to engage a flange 120 of a boiling water nuclear reactor. The flange 120 of the boiling water reactor engages a dry tube 110, which houses a sensor. During use of the reactor, water and/or contaminants may collect in and/or around the flange 120.

In at least one example embodiment, during maintenance of the reactor, the outer tube 170 and the flange 120 are fitted together using a mounting assembly 160, such as a threaded fitting. Any other suitable attachment mechanism may be used to provide a secure fit between the outer tube 170 and the flange 120.

In at least one example embodiment, the flange flush tool 100 is a two-piece tool including the outer tube 170 and an actuator 140. The outer tube 170 is connected to the flange, and then the actuator 140 is connected to the outer tube 170. In at least one example embodiment, an attachment mechanism 125 between the outer tube 170 and the actuator 140 is a quick connect mechanism that allows for quick connection and release between the outer tube 170 and the actuator 140. In at least one example embodiment, the quick connect mechanism includes a snap-fit connector, a threaded connector, or any other suitable connector.

In at least one example embodiment, the actuator 140 may be one of a pneumatic actuator, hydraulic actuator, or electric actuator. For example, the actuator may be a remotely controlled linear actuator. In other embodiments, the actuator may have a telescoping arrangement, such that when activated, a portion of the actuator 140 extends outwardly and pushes against the dry tube 110 so as to lift the dry tube 110 from the flange 120. In at least one example embodiment, the actuator 140 pushes the shield tube 200 which is attached to the dry tube 110 so as to lift the dry tube 110 from the flange 120. The actuator 140 is configured to provide sufficient force to raise the dry tube 110 from the flange 120 so as to release any water held within the flange 120. For example, the actuator 140 is configured to provide enough force to raise less than about 100 pounds. In some embodiments, the actuator 140 is configured to provide enough force to decouple the tapered seal between the dry tube 110 and the flange 120, and to lift the weight of the dry tube assembly. The initial force to separate the dry tube 110 and the flange 120 may be several hundred pounds, and the actuator 140 should be configured to provide sufficient force to lift the dry tube 110.

In at least one example embodiment, the actuator 140 includes one or more handles 180 to facilitate installation and connection of the actuator 140 to the outer tube 110. In other embodiments, the flange flush tool 100 does not include handles.

Figure 2:
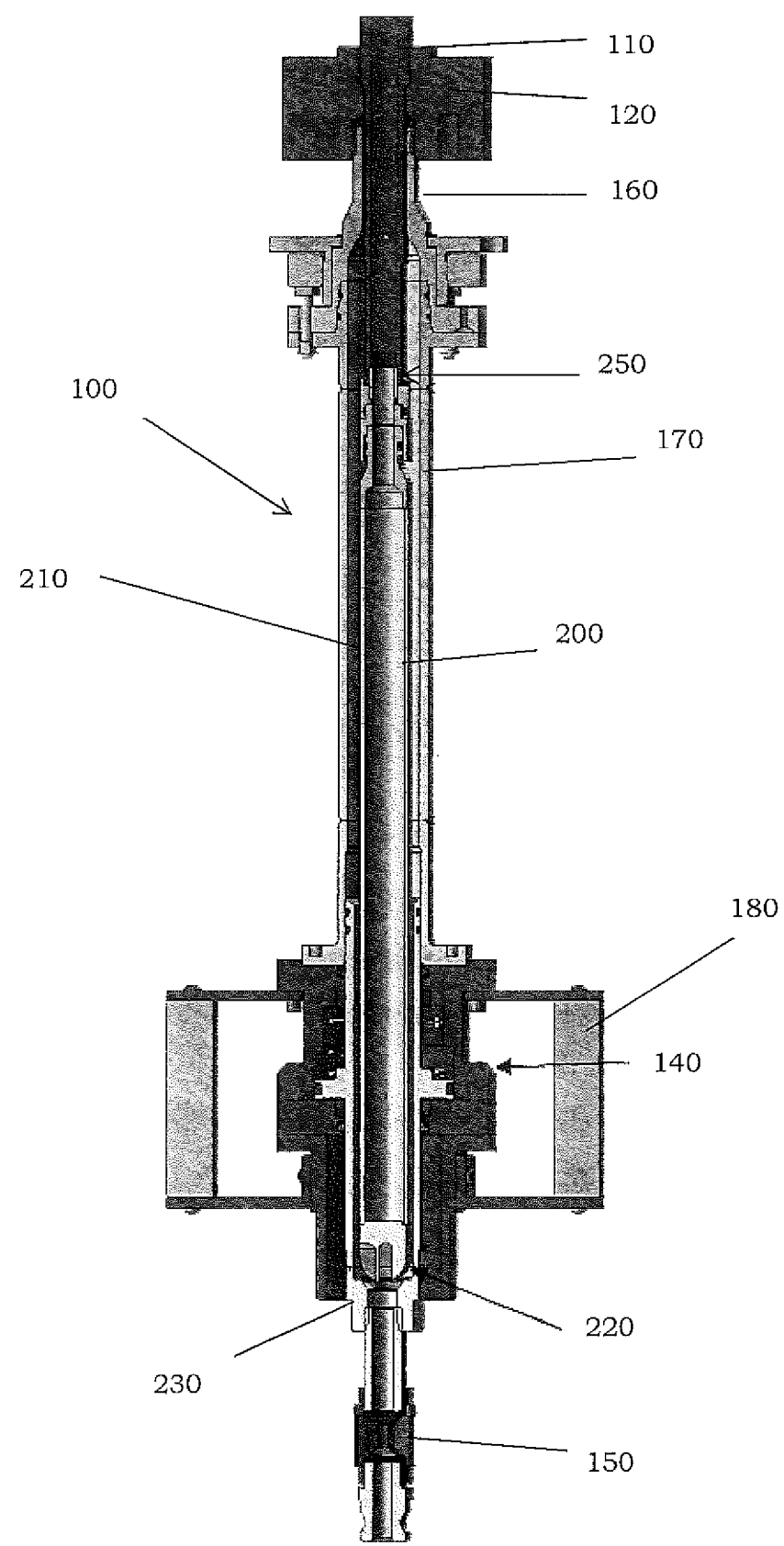
FIG. 2 is a cross-sectional view of the flange flush tool engaging the flange and the dry tube of FIG. 1 according to at least one example embodiment.

In at least one example embodiment, the flange flush tool 100 further includes a vacuum breaker 130 configured to selectively allow air into a channel (shown and described with respect to FIG. 2). The vacuum breaker 130 is a check valve. When the actuator 140 is stopped, vacuum breaker 130 is opened and water is drained out as air is allowed into the system via the vacuum breaker 130. In at least one example embodiment, the vacuum breaker allows air into the outer tube 170 with only a slight difference in pressure so as to drain all of the water from the tool and drain hose at the end of the process. When the actuator is released and the dry tube is reseated on the flange, the tool and drain hose are still full or water. The remaining water may not drain from the tool and drain hose without air to displace the volume. The momentum of the water through the tool and drain hose creates a slight vacuum in the upper part of the outer tube when the dry tube is reseated on the flange. This vacuum is enough differential pressure to automatically open the vacuum breaker and allow air into the tool so as to allow the water to completely drain from the tool and drain hose.

In at least one example embodiment, the flange flush tool 100 further includes a drain port 150. The drain port 150 is configured to drain water and/or contaminants from the channel (shown and described with respect to FIG. 2). The drain port 150 includes an isolation valve, such as a ball valve. During use of the flange flush tool 100, the drain port 150 is open, but may be closed to stop water flow if needed.

In at least one example embodiment, the outer tube 170 has an inner diameter ranging from about 2 inches to about 10 inches (e.g. about 3 inches to about 9 inches, about 4 inches to about 8 inches, or about 5 inches to about 7 inches).

FIG. 2 is a cross-sectional view of the flange flush tool engaging the flange and the dry tube of FIG. 1 according to at least one example embodiment.

In at least one example embodiment, as shown in FIG. 2, the dry tube 110 extends through the flange 120 and into a portion of the flange flush tool 100. The dry tube 110 contacts an end portion 250 of a shield tube 200 that is coaxially positioned within the outer tube 170. A channel 210 is defined between the shield tube 200 and an inner surface of the outer tube 170. The channel 210 is in fluid communication with the flange 120 when the dry tube 110 is lifted from a resting position within the flange 120.

In at least one example embodiment, the shield tube 200 is configured to move longitudinally within the outer tube 170. The end portion 250 of the shield tube 200 is sized and configured to contact and/or engage an end portion of the dry tube 110. The end portion 250 may include a watertight gland adapter that protects cabling and transmits actuator lifting force to the dry tube and/or dry tube gland.

The flange 120 has an internal tapered portion that abuts a flared portion of the dry tube 110. During normal operation of the reactor, the dry tube 110 is seated within the tapered portion. During use of the flange flush tool 100, the end portion 250 pushes against the end portion of the dry tube 110 so as to move the dry tube 110 upwardly and unseat the dry tube 110 within the flange 120.

In at least one example embodiment, the shield tube 200 includes a second end surface having a contact point 220. The contact point 220 is configured to engage a contact surface 230 of the actuator 140. The shield tube 200 extends through at least a portion of a length of the actuator 140. The contact point 220 of the shield tube 200 abuts the contact surface 230 of the actuator 140.

In at least one example embodiment, the shield tube 200 has an outer diameter ranging from about 1 inch to about 9 inches (e.g., about 2 inches to about 8 inches, about 3 inches to about 7 inches, or about 4 inches to about 6 inches). Dimensions of the channel 210 may depend upon diameters of the outer tube 170 and the shield tube 200.

In at least one example embodiment, each of the outer tube 170 and the shield tube 200 has a generally circular cross-section. In other example embodiments, the outer tube 170 and the shield tube 200 may have polygonal cross-sectional shapes. The cross-sectional shapes of the outer tube 170 and the shield tube 200 may be the same or different.

In at least one example embodiment, each of the outer tube and the shield tube are formed of stainless steel.

The channel 210 is sized and configured to allowed water to drain from the flange 120.

In at least one example embodiment, the actuator 140 is configured to move the shield tube 200 longitudinally within the outer tube 170 when force is supplied by the actuator assembly. When the shield tube 200 is moved upwardly, the end portion 250 pushed against the dry tube 110 and lifts the dry tube 110 from the resting position against the flange 120. Once the dry tube 110 is lifted, any water that has collected in the flange 120 is released from the flange 120. The water flows through the channel 210 and down through the drain port 150, where the waste water may be collected and/or contained.

In at least one example embodiment, the flange flush tool 100 is about 1 foot to about 4 feet in length.

Figure 3:
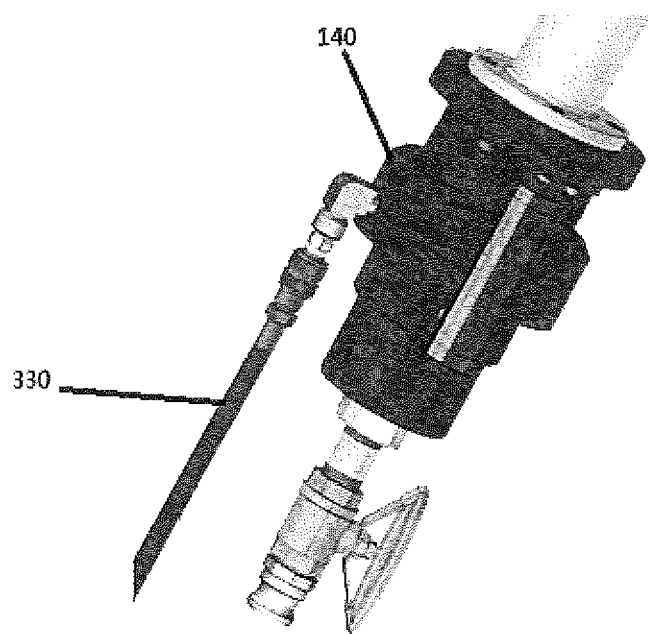
FIG. 3 is a side perspective view of a portion of the flange flush tool of FIG. 1 according to at least one example embodiment.

FIG. 3 is a side perspective view of a portion of the flange flush tool of FIG. 1 according to at least one example embodiment.

In at least one example embodiment, as shown in FIG. 3, an air hose 300 is connected to a portion of the actuator 140. The air hose 300 is configured to deliver a portion of air from a compressed air source, such that the actuator 140 pushes vertically on the shield tube 200 (shown in FIG. 2), which is attached to the dry tube 110 so as to lift the dry tube 110 from the flange 120.

Figure 4:
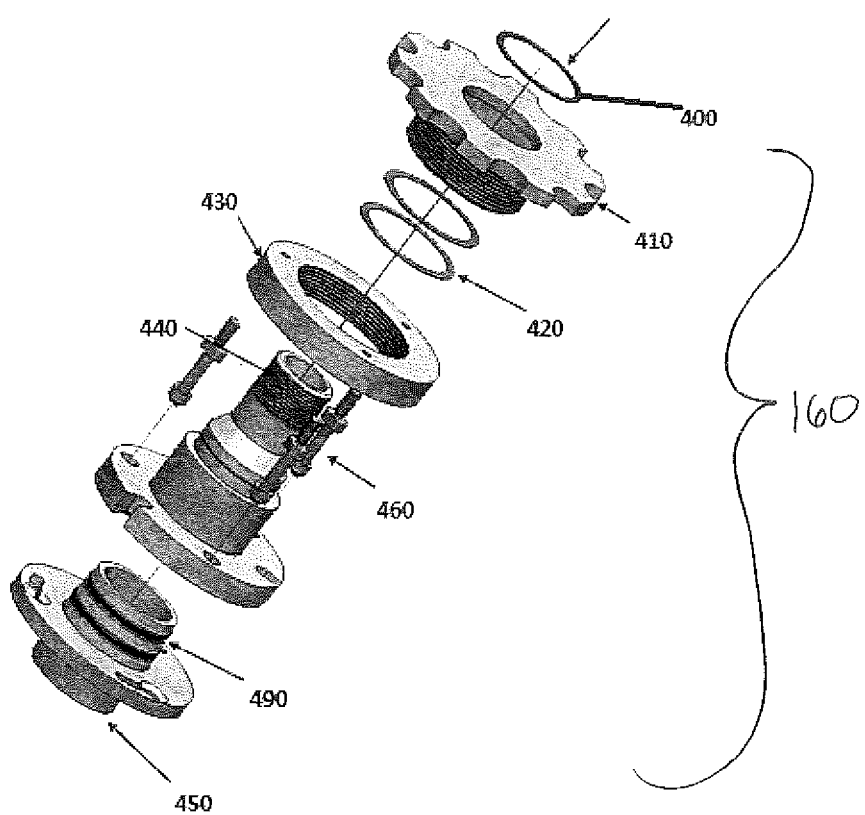
FIG. 4 is an exploded view of a mounting assembly of a flange flush tool according to at least one example embodiment.

FIG. 4 is an exploded view of a mounting assembly of a flange flush tool according to at least one example embodiment.

In at least one example embodiment, as shown in FIG. 4, the mounting assembly 160 may include a spiral retaining ring 400, a flange tightening ring 410, one or more brass shims or bearings 420, a lifting ring 430, an adapter 440, and a lower flange 450. The adapter 440 is inserted through the lifting ring 430, the one or more brass shims or bearings 420, the flange tightening ring 410, and the spiral retaining ring 400. The adapter 440 has a threaded portion that is configured to engage the dry tube 110. O-ring seals 490 may circumscribe the lower flange 450. Support pins 460 may hold the mounting assembly 160 together, and the lower flange 450 may be welded to the remaining portions of the flange flush tool 100, such as the outer tube 170

Figure 5:
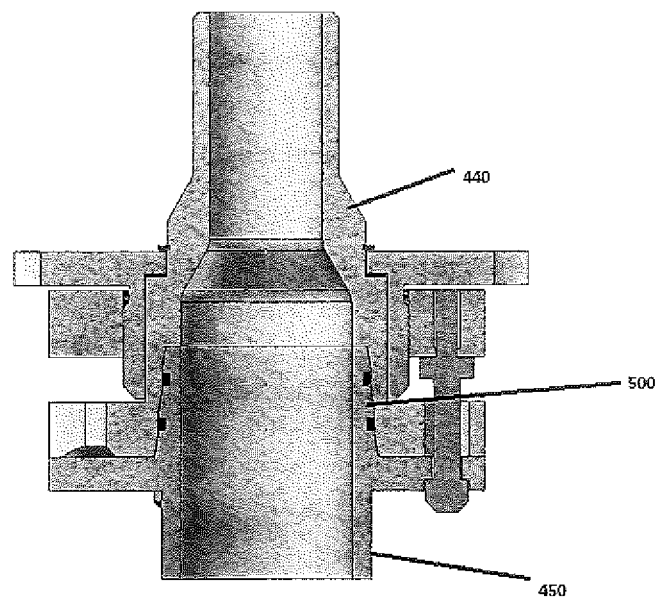
FIG. 5 is an enlarged cross-sectional view of the mounting assembly of FIG. 4 according to at least one example embodiment.
Figure 6A:
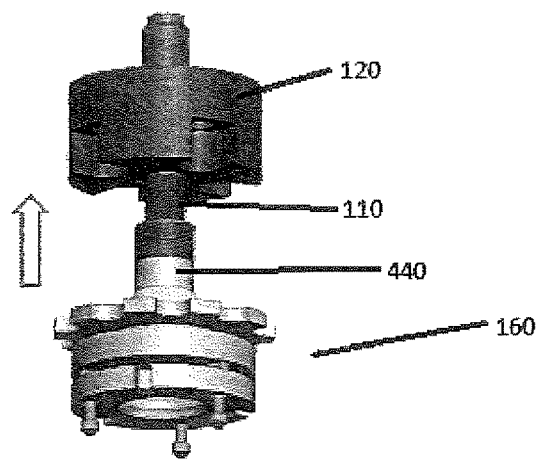
FIGS. 6A, 6B, 6C, and 6D are illustrations of the mounting assembly being engaged with a flange and a dry tube according to at least one example embodiment.
Figure 6C:
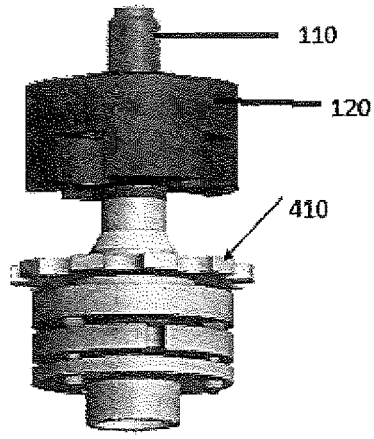
Figure 6B:
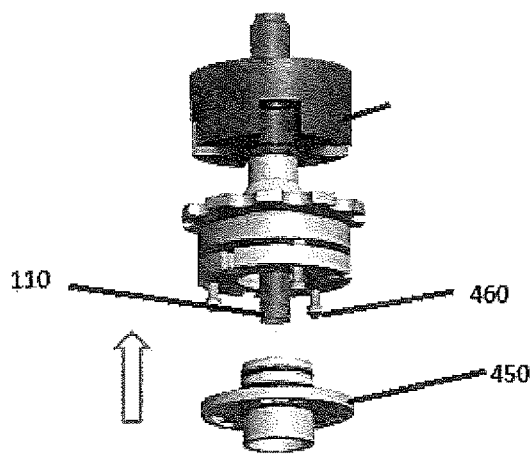
Figure 6D:
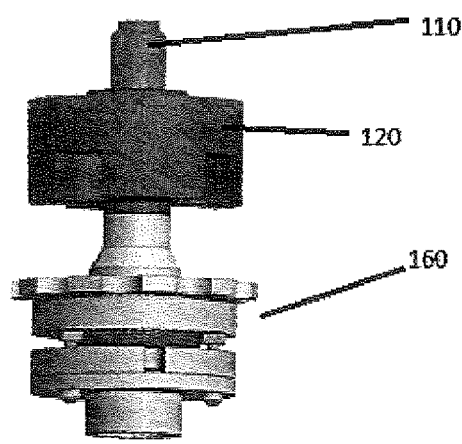

FIG. 5 is an enlarged cross-sectional view of the mounting assembly of FIG. 4 according to at least one example embodiment.

In at least one example embodiment, as shown in FIG. 5, the lower flange 450 has a nose portion 500 that is received within a portion of the adapter 440.

FIGS. 6A, 6B, 6C, and 6D are illustrations of the mounting assembly being engaged with a flange and a dry tube according to at least one example embodiment.

In at least one example embodiment, in use as shown in FIGS. 6A, 6B, 6C, and 6D, to connect the mounting assembly 160, the threaded portion of the adapter 440 is positioned over the dry tube 110 and into the flange 120. Then the support pins 460 are aligned with holes in the lower flange 450. The entire assembly is then rotated until it stopes, and the pins 460 support the weight thereof. The flange tightening ring 410 is then rotate to pull the two assemblies together. The O-rings substantially prevent any leaks.

Figure 7:
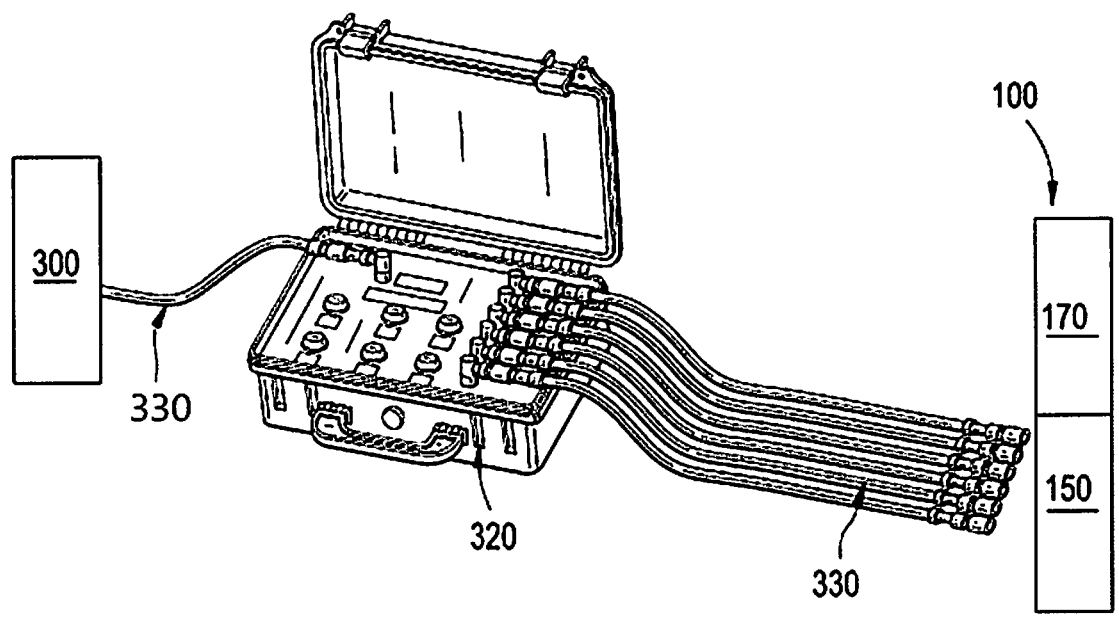
FIG. 7 is a schematic illustration of an air supply hose, controller, and air hoses configured to attach to flange flush tools according to at least one example embodiment.

FIG. 7 is an illustration of an air supply hose, controller, and air hoses configured to attach to flange flush tools according to at least one example embodiment.

In at least one example embodiment, as shown in FIG. 7, the flange flush tool 100 is connected to a compressed air supply 300 via an air supply line 310, a control panel 320, and at least one air hose 330. The control panel 320 may be a simple control panel including at least one push-button valve.

In at least one example embodiment, the flange flush tool 100 includes a plurality of air hoses 330. The number of air hoses may be equivalent to a number of flange and dry tube assemblies within a reactor.

In at least one example embodiment, the flange flush tool 100 is configured to lift less than about one hundred pounds. The flange flush tool 100 is configured to lift the dry tube 110 from the resting position in the flange 120 enough to release any water and/or contaminants held within the flange 120.

In at least one example embodiment, the actuator 140 is formed of aluminum.

In at least one example embodiment, control of the flange flush tool 100 may require an operator to maintain contact with the control panel 320 so as to avoid and/or reduce risk of leakage. The purpose of having an operator maintain contact with the push button valve on the control panel 320 is to prevent and/or reduce unintended and/or unmonitored release of reactor water.

Figure 8:
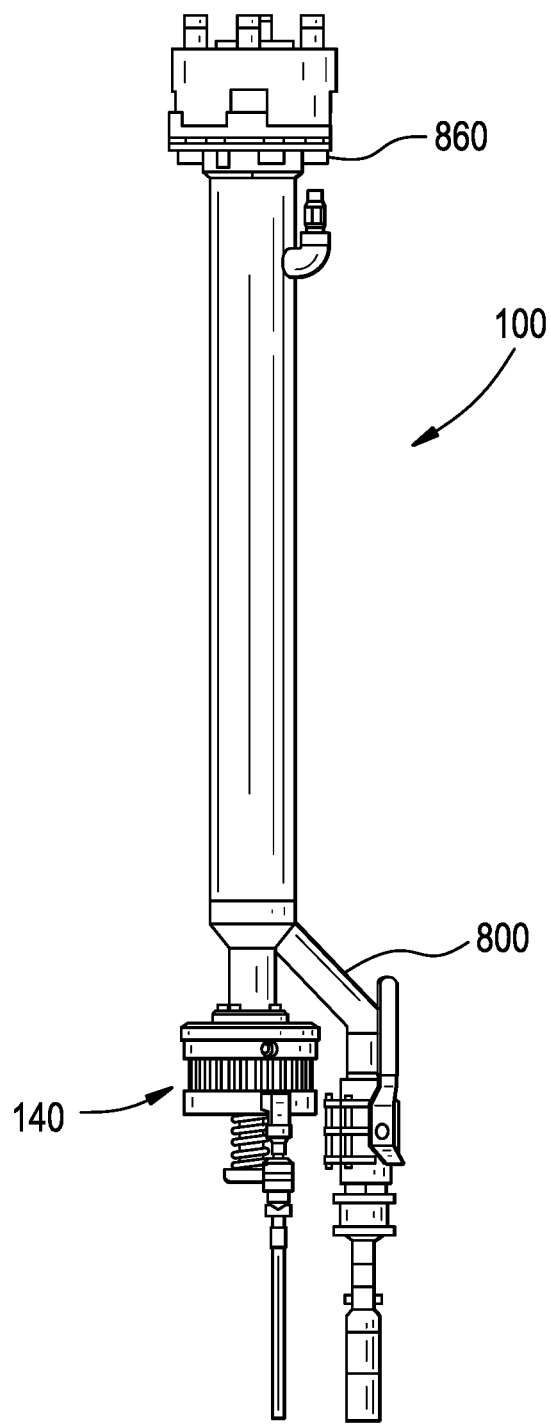
FIG. 8 is a side view of a flange flush tool according to at least one example embodiment.

FIG. 8 is a side view of a flange flush tool according to at least one example embodiment.

In at least one example embodiment, the flange flush tool may be generally the same as in FIGS. 1-2, but may include a simplified mounting assembly 860 (discussed in detail with respect to FIGS. 10A-10R and FIG. 12), a diverter 800, and an off-the-shelf pneumatic actuator 140. The diverter 800 is configured to divert water drained from the flange 120 away from the actuator 140.

Figure 9:
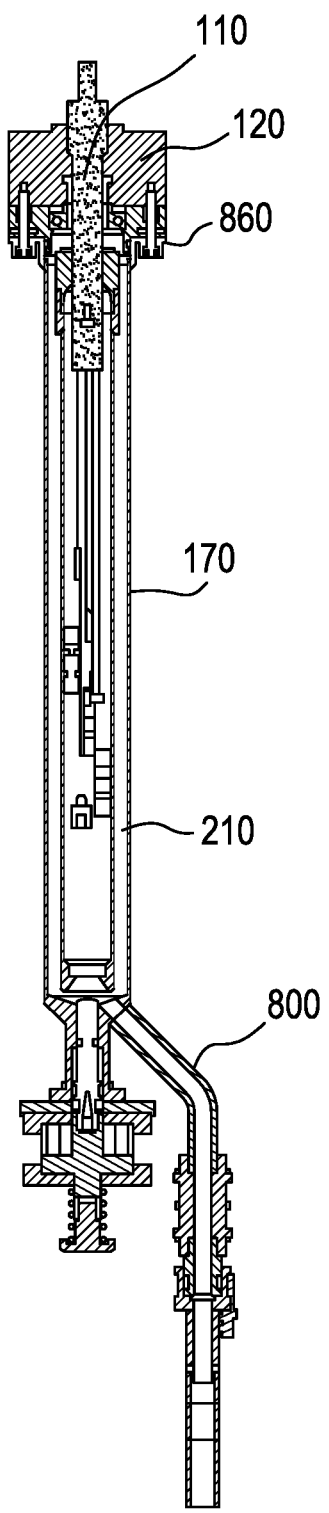
FIG. 9 is a cross-sectional view of the flange flush tool of FIG. 8 according to at least one example embodiment.

FIG. 9 is a cross-sectional view of the flange flush tool of FIG. 8 according to at least one example embodiment.

In at least one example embodiment, as shown in FIG. 9, when the dry tube 110 is lifted from the flange 120, water flows through the channel 210 and into the diverter 800, which may be a tube extending from the outer tube 170. The diverter 800 diverts the water away from the actuator 140. The diverter 800 may be connected to a drain and/or drain hose.

Figure 10A:
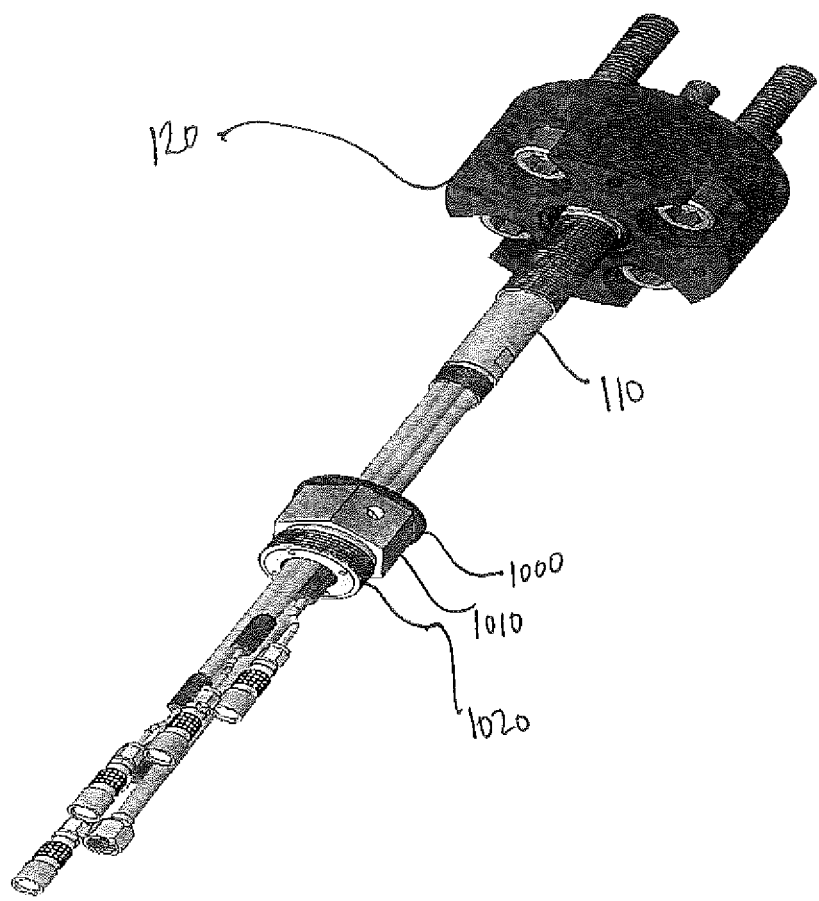
FIGS. 10A-10R are illustrations of a method of mounting a flange flush tool on a flange and dry tube according to at least one example embodiment.
Figure 10B:
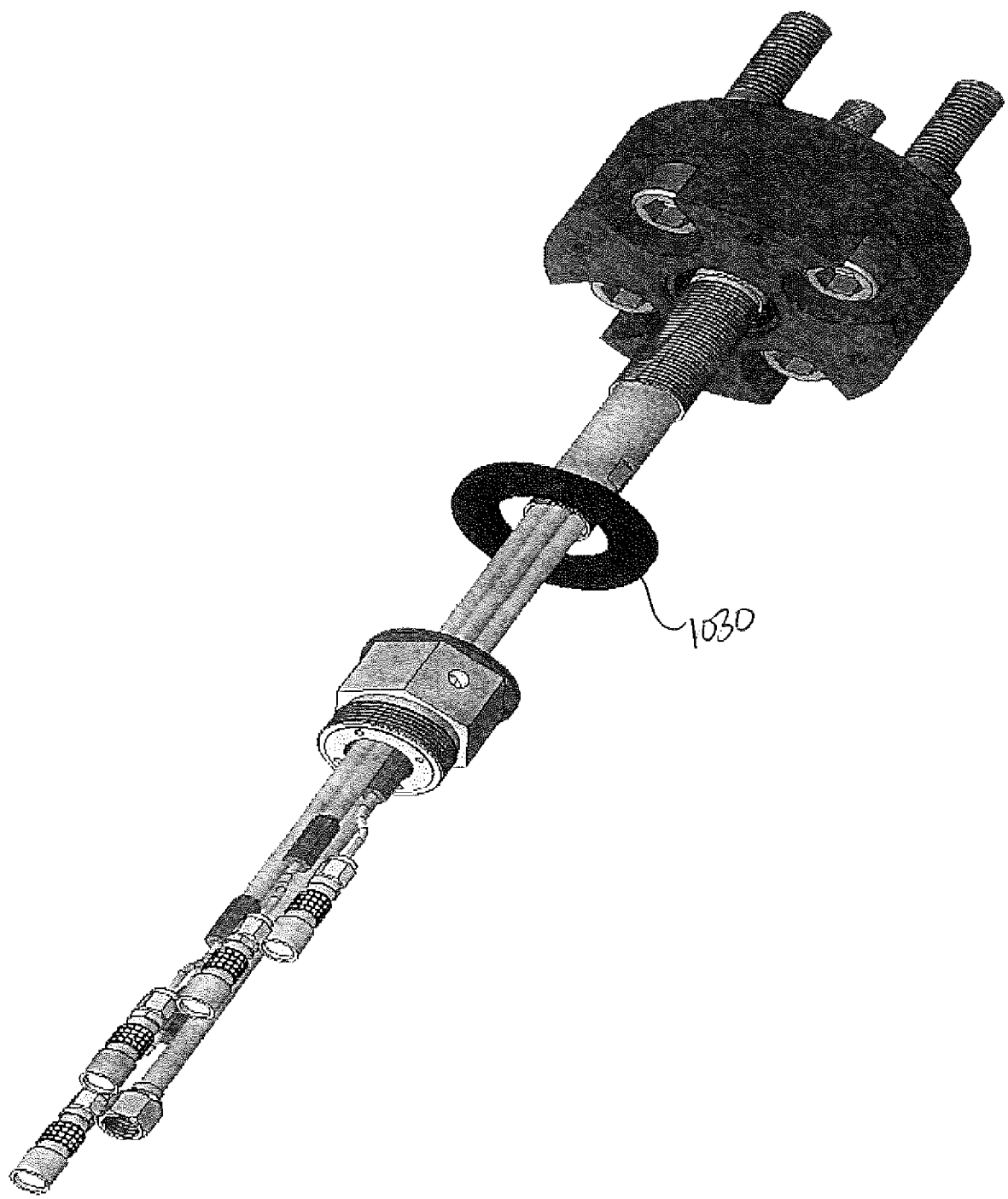
Figure 10C:
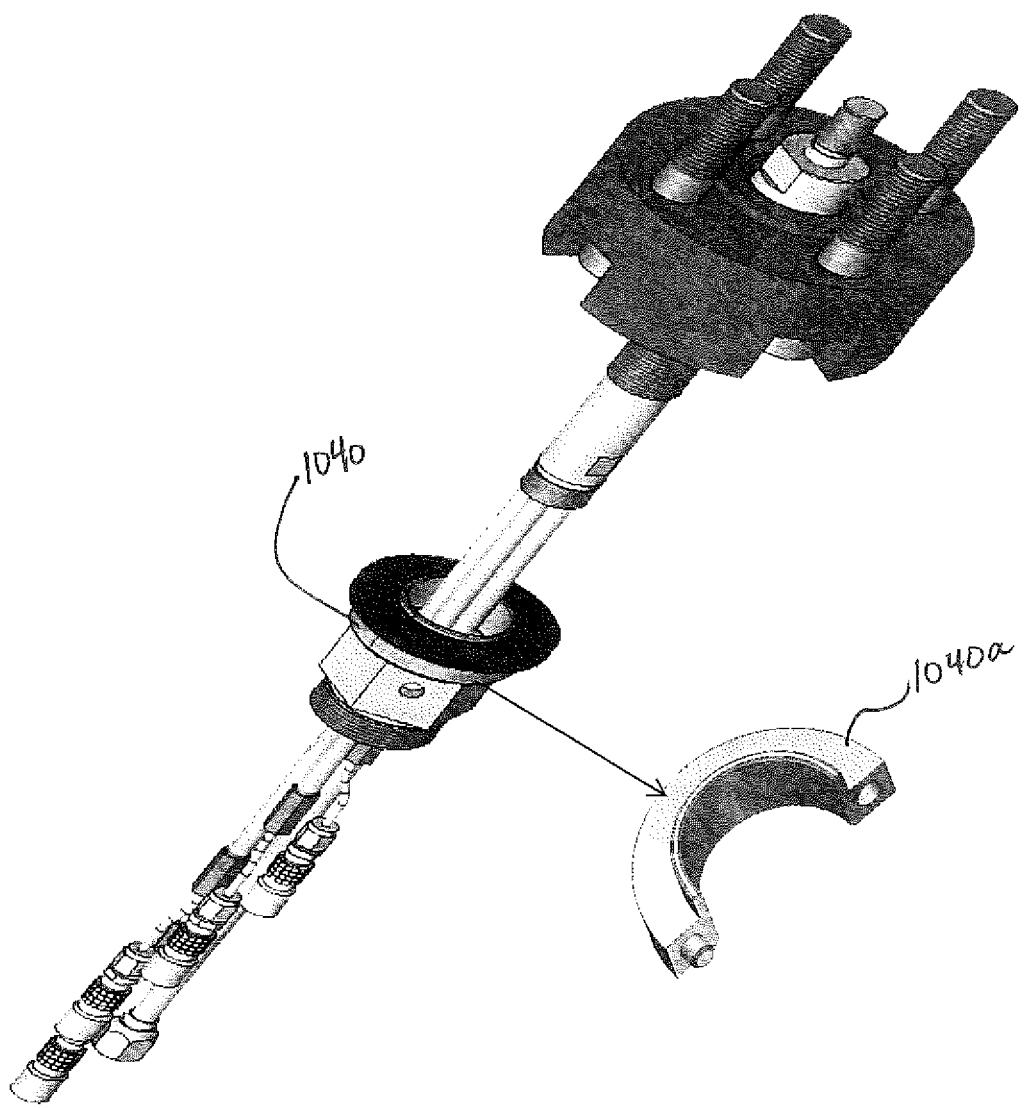
Figures 10D, 10E:
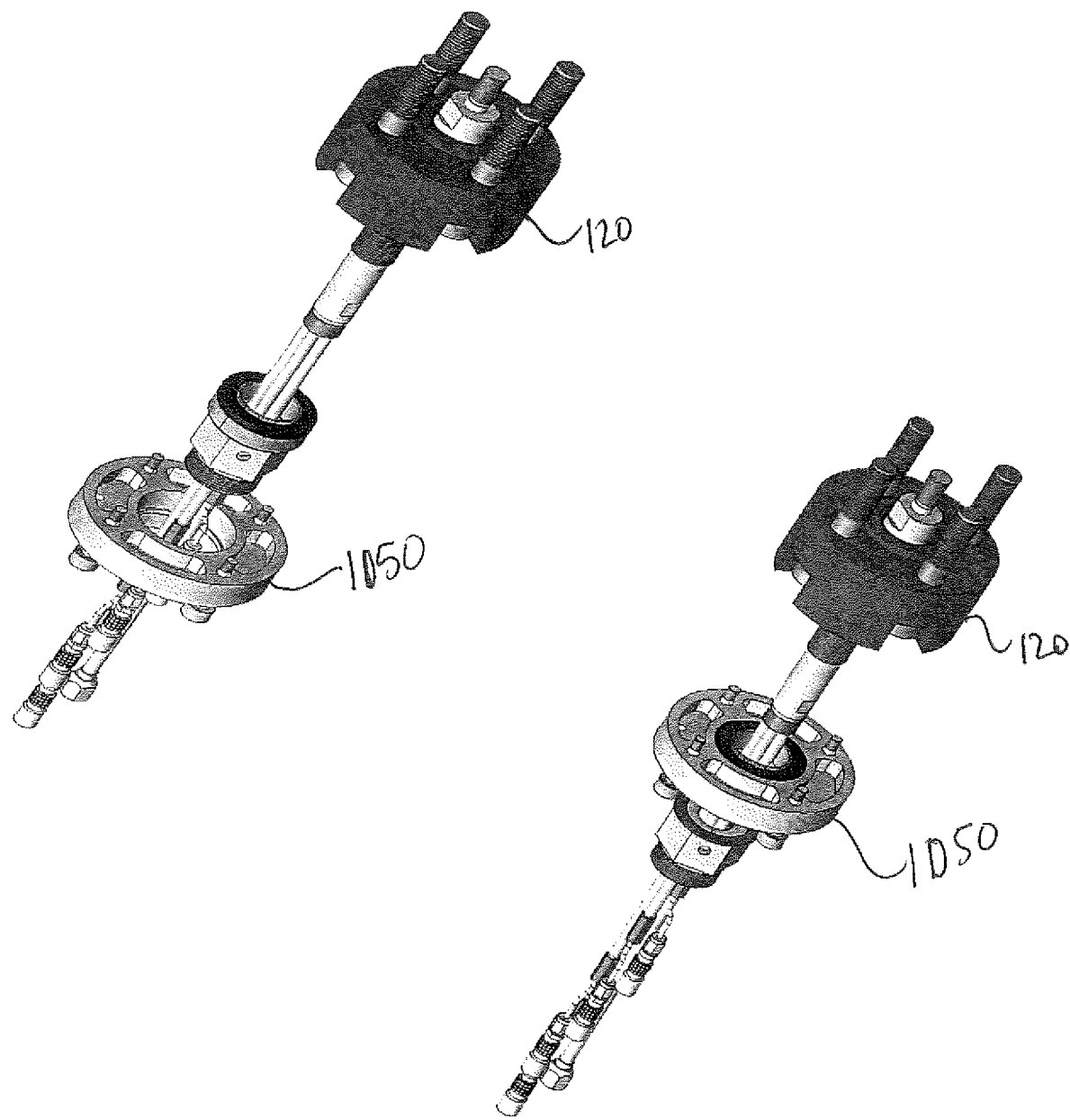
Figure 10F:
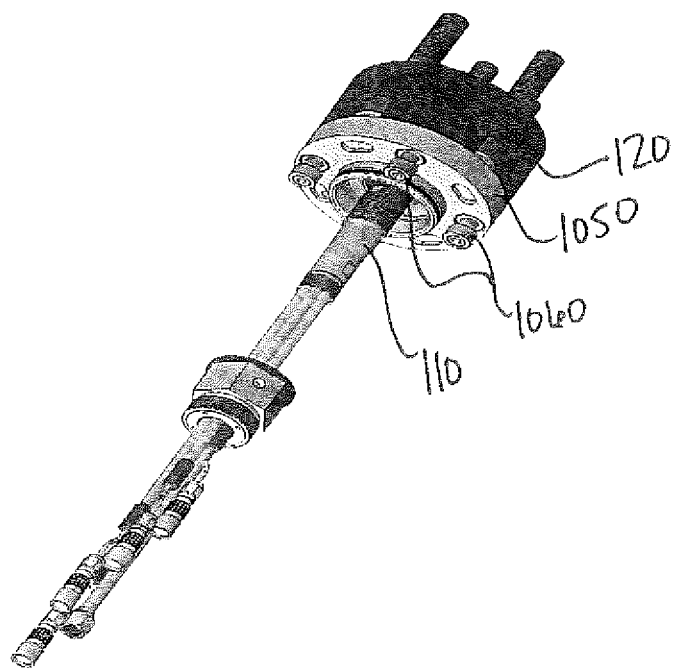
Figure 10G:
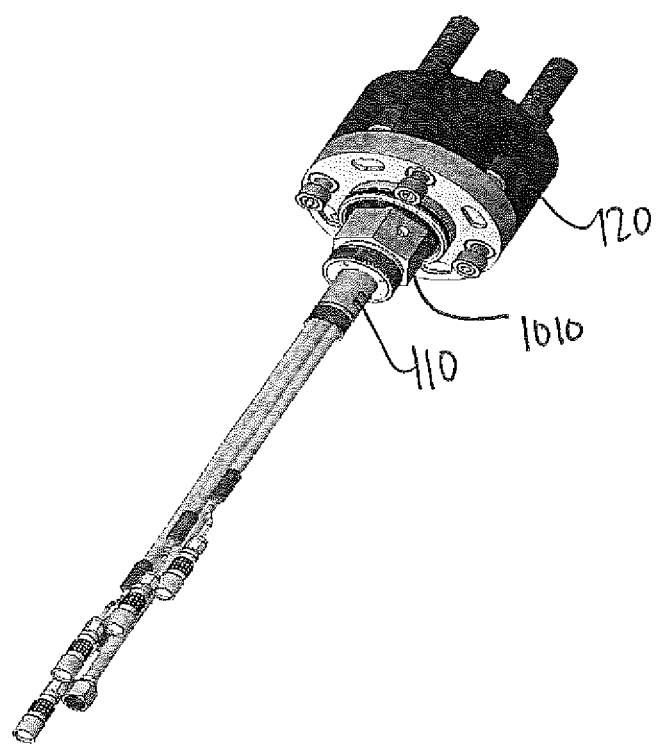
Figure 10J:
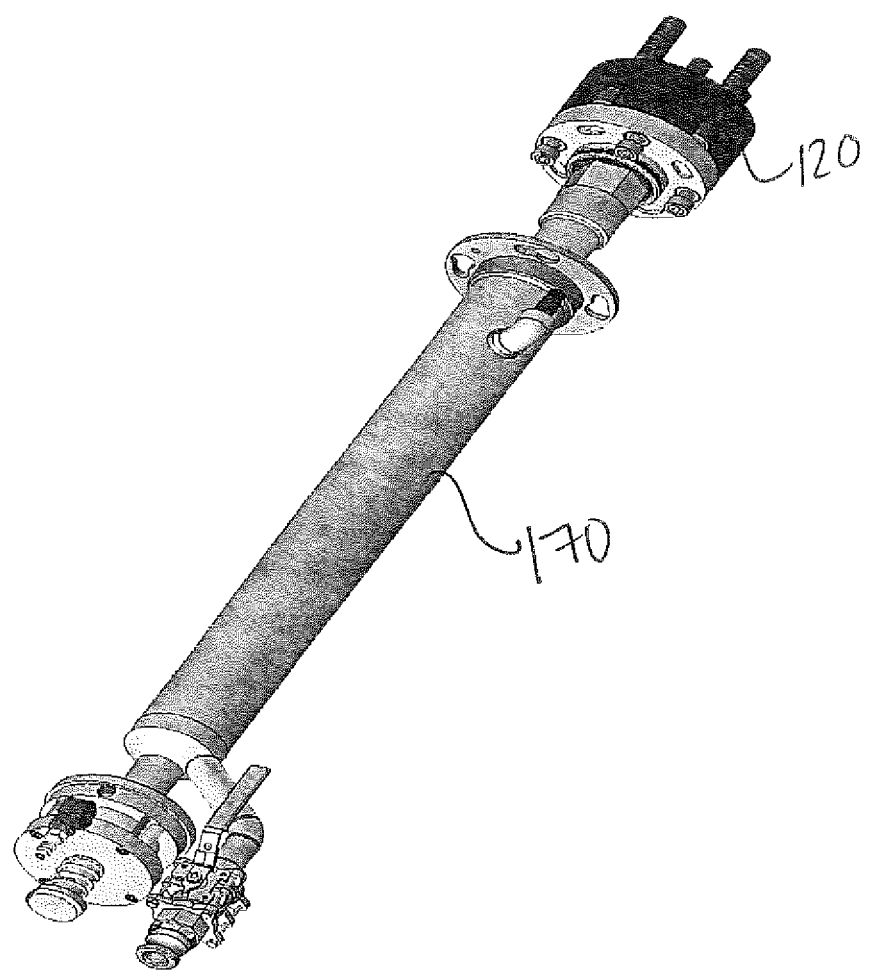
Figure 10K:
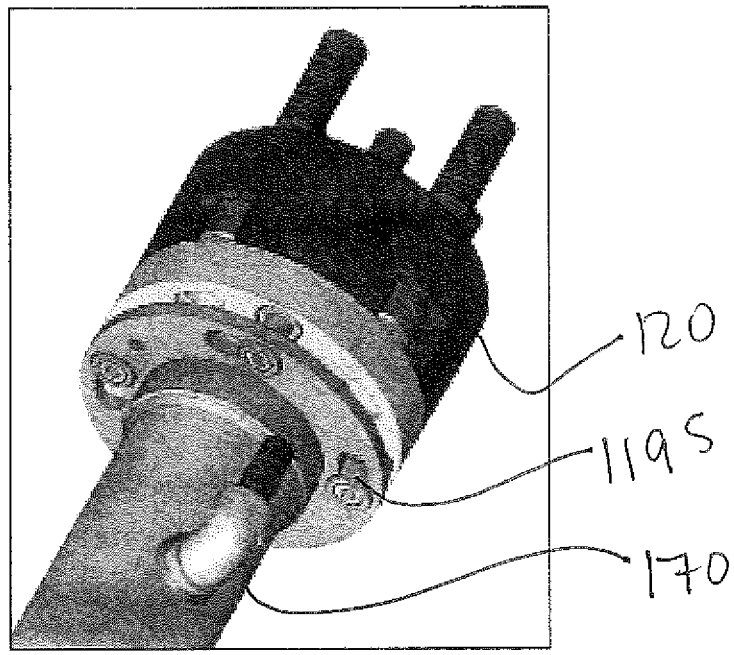
Figure 10L:
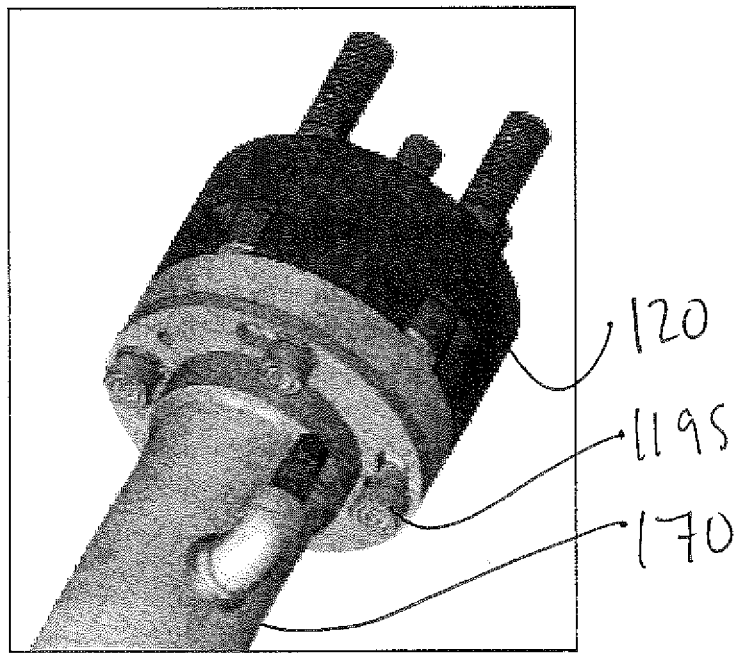
Figure 10M:
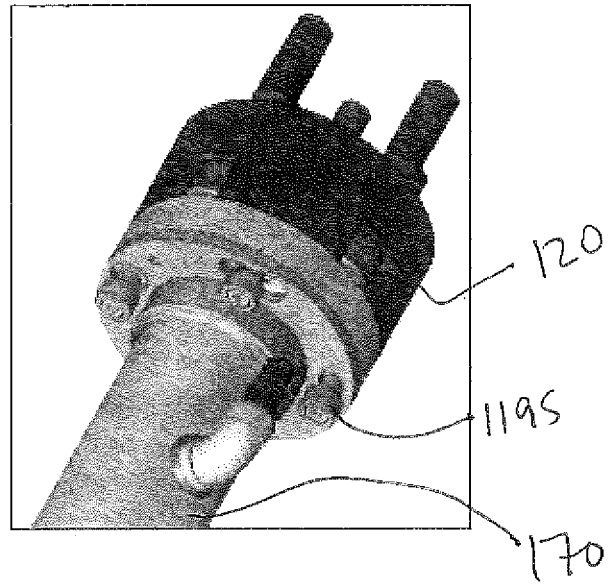
Figure 10N:
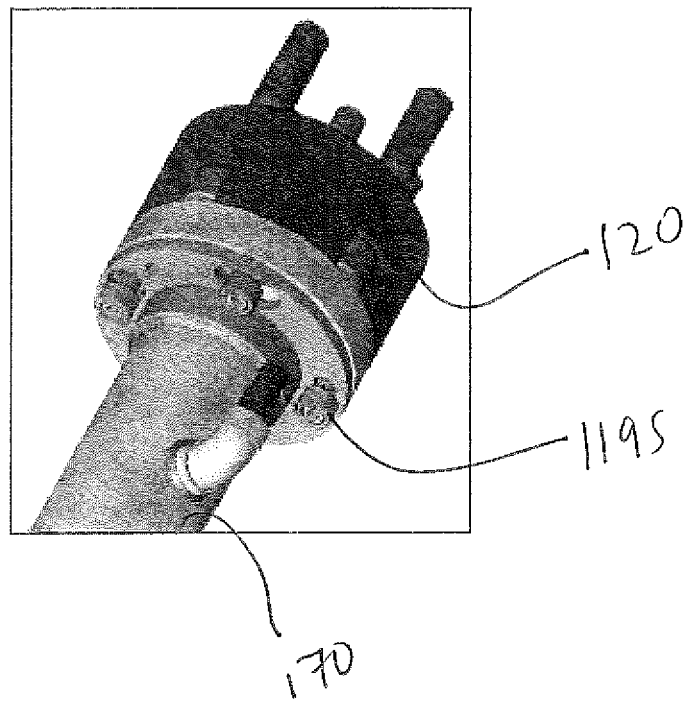
Figure 10R:
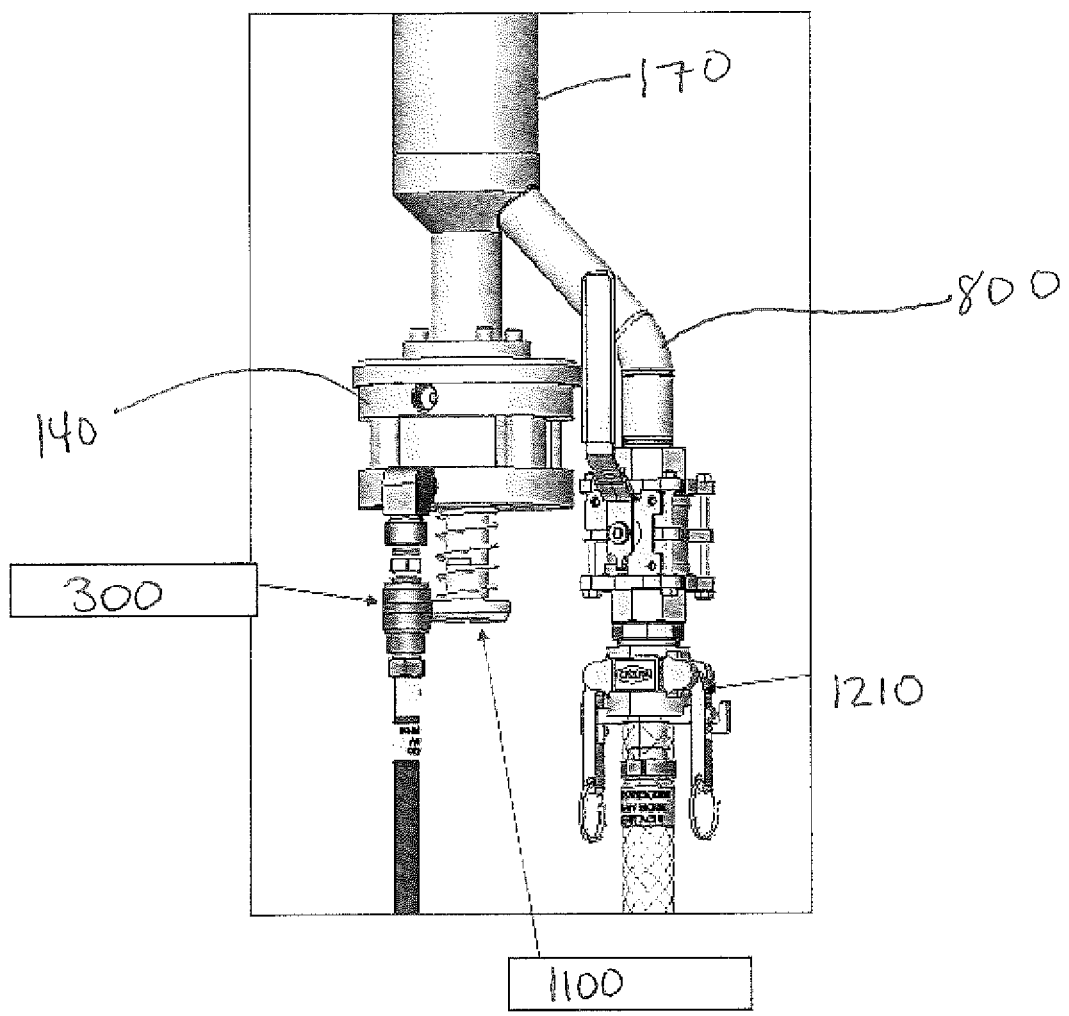

FIGS. 10A-10R are illustrations of a method of mounting a flange flush tool on a flange and dry tube according to at least one example embodiment.

In at least one example embodiment, as shown in FIG. 10A, to install the flange flush tool, a washer 1000, nut 1010 and seal 1020, which are part of the dry tube assembly are unthreaded from the flange 120 and the dry tube 110, and moved downward over electrical connectors, but are not removed. Then, as shown in FIG. 10B, a gasket 1030, such as a polyurethane gasket is stretched over the nut 1010, the washer 1000, and the seal 1020. Gasket supports 1040, shown in FIG. 10C, are positioned between the nut 1010, the washer 1000, and the seal 1020, and the gasket 1030. The gasket supports 1040 may be half circle shaped bodies that fit together to form a circle about the nut 1010, the washer 1000, and the seal 1020, and below the gasket 1030. As shown in FIGS. 10D and 10E, an upper flange assembly 1050, which may be a generally ring-shaped body having a channel defined therein, is positioned over the electrical connectors, the gasket 1030, and the gasket supports 1040. The upper flange assembly 1050 is moved towards the flange 120. As shown in FIG. 10F, the upper flange assembly is attached to the flange 120 with socket head cap screws 1060 or any other suitable connector. As shown in FIG. 10G, the nut 1010 is then threaded around the dry tube 110 until a top of the nut 1010 is about level with a bottom edge of the flange 120, while the seal 1020 remains loose and is not threaded onto the dry tube 110. As shown in FIG. 10H, a large O-ring 1070 and a small O-ring 1080 are stretched and passed over the electrical cables and connectors, and the seal 1020. The small O-ring 1080 is placed around the dry tube 110, while the large O-ring 1070 is placed over the nut 1010. Next, as shown in FIG. 10I, the shield tube 200 is placed over the electrical cables and connectors and threaded on the nut 1010. The shield tube 200 captures the seal 1020 causing the seal 1020 to slightly compress the O-ring 1080 so as to seal just below dry tube threads along the dry tube 110. The shield tube 200 is threaded onto the nut 1010. As shown in FIG. 10J, the outer tube 170 and remaining portions of the main flush tool assembly are placed over the shield tube 200 and secured to the flange 120 by aligning the outer tube 170 and the assembly with mounting studs 1195 as shown in FIGS. 10K and 10L. The outer tube 170 and the assembly are then rotated clockwise until a stop is detected and the outer tube 170 and assembly rest on the mounting studs 1195 as shown in FIGS. 10M, 10N, and 100. Next, a quick-release pin 1200 may be inserted into a hole in a flange 1205, which extends from the outer tube 170 and is part of the assembly as shown in FIGS. 10P and 10Q. Finally, the air hose 300 may be connected to the actuator 140, which is attached to an end of the outer tube 170, and a drain hose 1210 may be connected to the diverter 800. As shown, the actuator 140 may include an actuator indicator 1100.

Figure 11:
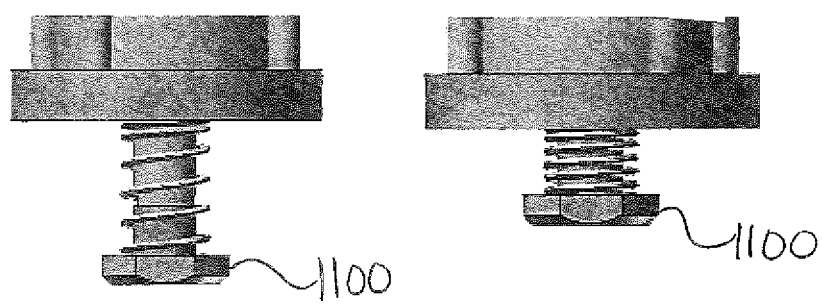
FIGS. 11A and 11B are illustrations of an actuation indicator of a flange flush tool according to at least one example embodiment.

FIGS. 11A and 11B are illustrations of an actuation indicator of a flange flush tool according to at least one example embodiment.

In at least one example embodiment, the actuator 140 may be a double rod end style actuator including the actuator indicator 1100 that provides a visual indication as to an actuation status of the flange flush tool described herein. As shown in FIG. 11A, the actuator indicator 1100 is configured to be in an extended position when not actuated. The actuator indicator 1100 is configured to be in a compressed position when the actuator 140 is actuated.

Figure 12:
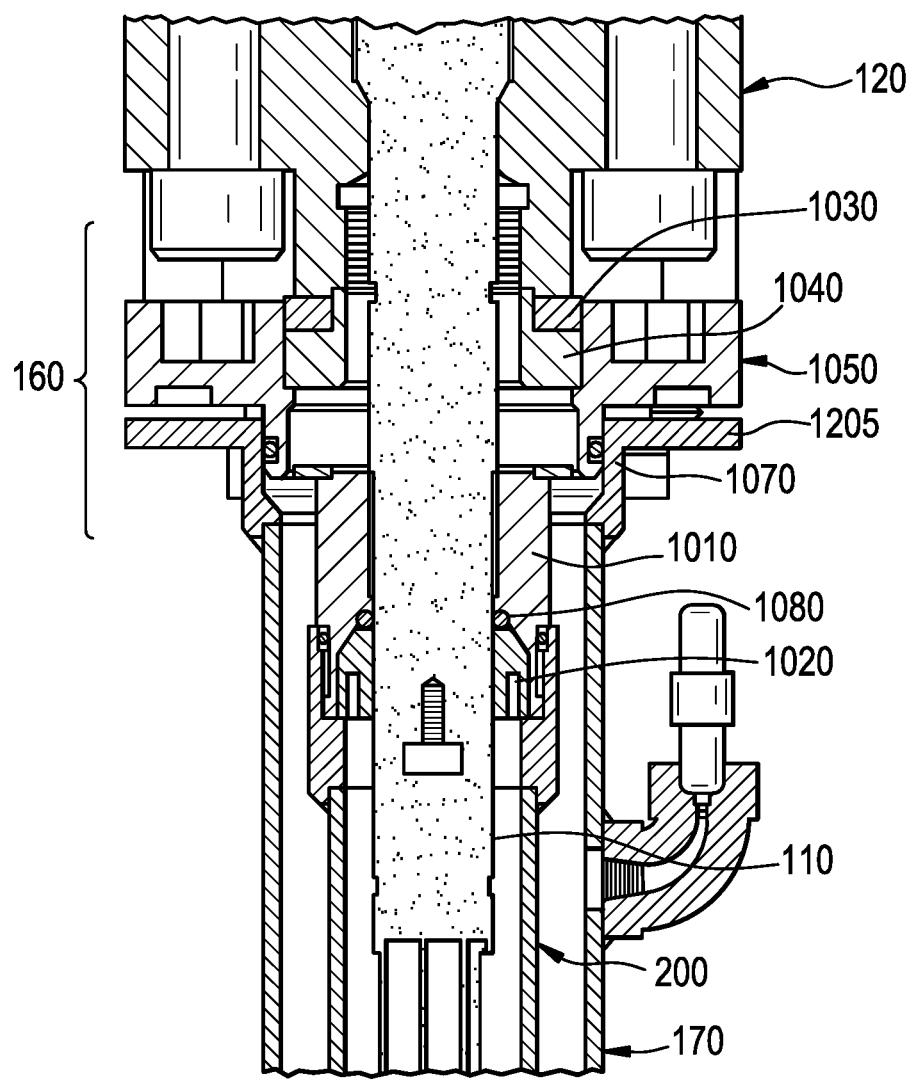
FIG. 12 is a cross-sectional view of the mounting assembly of FIGS. 8, 9, and 10A-10R according to at least one example embodiment.

FIG. 12 is a cross-sectional view of the mounting assembly of FIGS. 8, 9, and 10A-10R according to at least one example embodiment.

In at least one example embodiment, as shown in FIG. 12, the mounting assembly 860 is simplified and includes fewer parts as compared to the mounting assembly 160 of FIGS. 1-4. The mounting assembly 860 of FIG. 12 does not require removal of the nut, the washer, and the seal, which may be part of the dry tube and flange assembly thereby simplifying installation and allowing installation of a flange flush tool where the nut, the washer, and the seal cannot fit over electrical cables and/or connections. Moreover, the mounting assembly 860 does not required the spiral retaining ring 400, the flange tightening ring 410, the shims 420, the lifting ring 430, the adapter 440, the lower flange 450, and the support pins 460. Instead, the mounting assembly 860 includes the outer tube 170 including the flange 1205 that is placed over the shield tube 200, which is attached to the nut 1010 once various gaskets and/or O-rings have been positioned about the dry tube.

In at least one example embodiment, a method of flushing a flange in a boiling water reactor comprises engaging an end surface of a dry tube seated in the flange, and lifting the dry tube from the flange so as to drain reactor water from the flange.

The method may also include shutting down the reactor and removing cabling prior to the engaging.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A flange flush tool for cleaning a flange of a dry tube in a nuclear reactor, the flange flush tool comprising:
    an outer tube having a first end and a second end, the first end configured to engage the flange;
    a shield tube within the outer tube, a channel defined between an outer surface of the shield tube and an inner surface of the outer tube, the shield tube configured to move longitudinally within the outer tube;
    an actuator configured to move the shield tube within the outer tube, such that an end portion of the shield tube engages an end of the dry tube, pushes against the dry tube, and lifts the dry tube away from the flange so as to release water from the flange; and
    a diverter extending from the outer tube, the diverter in communication with the channel, and the diverter configured to channel the water away from the flange and the actuator.

2. The flange flush tool of claim 1, wherein the actuator is a coaxial pneumatic actuator.

3. The flange flush tool of claim 2, further comprising:
    a compressed air supply;
    a control panel including at least one push-button valve; and
    at least one air hose in fluid communication with the coaxial pneumatic actuator.

4. The flange flush tool of claim 1, wherein the actuator is one of a hydraulic or an electric actuator.

5. The flange flush tool of claim 1, wherein the shield tube has a second end surface including a contact point, the contact point configured to engage the actuator.

6. The flange flush tool of claim 1, further comprising:
    a vacuum breaker configured to selectively allow air into the channel.

7. The flange flush tool of claim 1, wherein the outer tube has an inner diameter ranging from about 2 inches to about 10 inches.

8. The flange flush tool of claim 1, wherein the shield tube has an outer diameter ranging from about 1 inch to about 9 inches.

9. The flange flush tool of claim 1, wherein each of the outer tube and the shield tube are formed of stainless steel.

10. A method of flushing a flange in a boiling water reactor comprises:
    engaging an end surface of a dry tube seated in the flange using an end portion of a shield tube of the flange flush tool of claim 1;
    lifting the dry tube from the flange so as to drain reactor water from the flange; and
    diverting water away from the flange and an actuator via a diverter extending from an outer tube.

11. The method of claim 10, wherein the engaging occurs after shutting down a reactor housing the flange.

12. The method of claim 11, wherein the reactor is a boiling water reactor.

* * * * *